United States Patent [19]

Matsuda

[11] 4,333,371
[45] Jun. 8, 1982

[54] SAW BLADES HAVING COOLANT PASSAGES AND APPARATUS FOR USING THE BLADES

[75] Inventor: Eiji Matsuda, Kyoto, Japan

[73] Assignee: Tani Saw Mfg. Co., Ltd., Osaka, Japan

[21] Appl. No.: 122,922

[22] Filed: Feb. 20, 1980

[30] Foreign Application Priority Data

Jul. 3, 1979 [JP] Japan .................................. 54-27047

[51] Int. Cl.³ .............................................. B23D 59/02
[52] U.S. Cl. ...................................... 83/169; 83/171; 83/835
[58] Field of Search .......................... 407/11; 409/136; 83/169, 171, 835; 51/267, 266, 207; 125/356, 15

[56] References Cited

U.S. PATENT DOCUMENTS

| | | | |
|---|---|---|---|
| 2,413,016 | 12/1946 | Wiken | 407/11 X |
| 3,176,675 | 4/1965 | Bomba | 125/15 |
| 3,196,584 | 7/1965 | Tatko | 51/267 X |
| 3,282,263 | 11/1966 | Christensen et al. | 125/15 |

FOREIGN PATENT DOCUMENTS

| | | | |
|---|---|---|---|
| 743122 | 5/1943 | Fed. Rep. of Germany | 51/207 |
| 576794 | 4/1946 | United Kingdom | 125/15 |
| 313700 | 8/1971 | U.S.S.R. | 125/15 |

*Primary Examiner*—J. M. Meister
*Attorney, Agent, or Firm*—Griffin, Branigan & Butler

[57] ABSTRACT

A saw blade having two or three blade members immovably coupled to each other, and having a plurality of coolant passages grooved on the interior of the blade members. The passages communicate with coolant inlet ports and terminate at openings located at the root peripheral side of the blade cutting edges. The saw blade releases coolant from itself which not only cools the blade members but also blows cut material from the blade cutting edges thereby facilitating a cutting operation being performed on a workpiece.

The saw blade may be utilized with a coolant feeding apparatus, having distributors which are rotatably driven and connected with stationary feeding pipes, the pipes having axial channels communicating with the coolant inlet ports of the saw blade.

3 Claims, 6 Drawing Figures

FIG. 4
FIG. 5
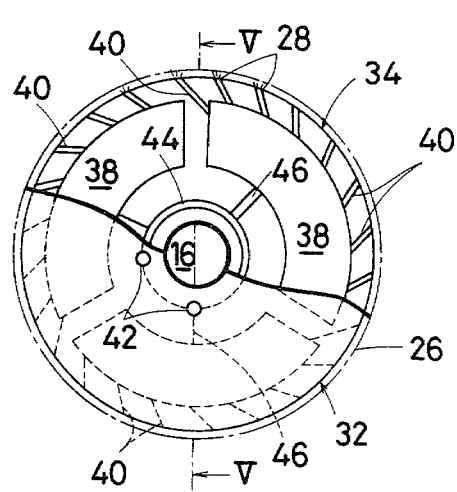
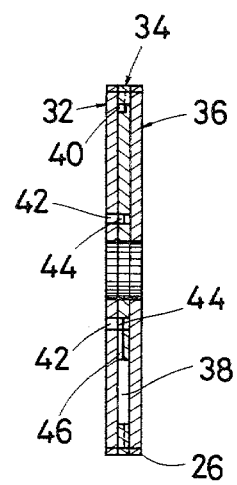

SAW BLADES HAVING COOLANT PASSAGES AND APPARATUS FOR USING THE BLADES

BACKGROUND OF THE INVENTION

The present invention relates to saw blades of a type suitable for cutting stainless steel and having two or three blade members immovably connected to each other and relates further to coolant feeding apparatus for use with said saw blades.

In the prior art it is well known to provide cutting tools or milling and slotting cutters consisting of two main bodies connected together. However, it has been not proposed as yet to arrange coolant passages on the opposed inside surfaces of the bodies with the passages directing the coolant at the cutting edges of the saw blades so as to remove cut work material from the cutting edges.

It is also a conventional practice to provide coolant feeding pipes supported near conventional saw blades from which coolant is poured over the region where a workpiece meshes with said blades.

SUMMARY OF THE INVENTION

Accordingly it is a major object of the present invention to provide new saw blades with ability to release coolant from the interior thereof to workpieces through the roots of cutting edges to blow away chips resting thereon, thereby facilitating a cutting operation and providing muffler effects by the use of two or three blade members.

BRIEF DESCRIPTION OF THE DRAWINGS

The foregoing and other objects, features, and advantages of the present invention will be apparent from the following more particular description of preferred embodiments of the present invention, as illustrated in the accompanying drawings. The drawings are not necessarily to scale, emphasis instead being placed on illustrating the principles of the present invention.

FIG. 4 is a view similar to FIG. 1, showing other saw blade according to the present invention;

FIG. 5 is a sectional view taken along line V—V in FIG. 4; and

DETAILED DESCRIPTION OF THE INVENTION

Figure 1:
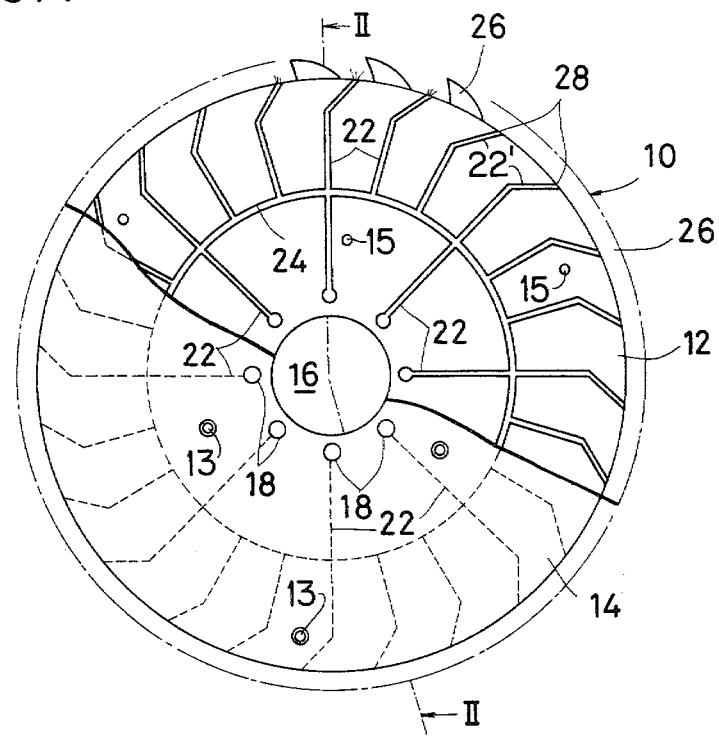
FIG. 1 is a partly broken-away elevation view of a saw blade according to the present invention.
Figure 2:
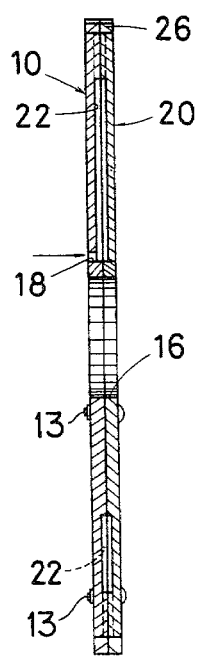
FIG. 2 is a sectional view taken along line II—II in FIG. 1.

According to the present invention, two or three blade members are coupled together by rivet means 13 extending through rivet holes 15 as shown in FIGS. 1 and 2. Electric welding techniques using an electron beam may be used for couplement. In cases where a gaseous coolant is used, it is preferable to use special adhesive on the opposed inside surfaces of the blades. In FIG. 1, a blade member 10 is shown having an inner surface 12 and an outer surface 14. In FIG. 2, two blade members 10,20 are shown coupled together by rivets 13. According to the present invention, coolant passages 22 are grooved into the inner surface 12 of at least one of the two blade members 10,20. FIG. 2 indicates an embodiment of the present invention wherein coolant passages 22 are provided on both blade members 10,20. Inlet ports or guide holes 18 are provided for liquid or gaseous coolant. The guide holes 18 are preferably located near a central aperture 16 through which extends a blade-supporting spindle. Coolant passages 22 are radially extended communicate with guide holes 18 and extend radially of the blades on inner surface 12. A circular groove 24 intersects the passages 22 and radially outwardly of the groove 24 the passages 22 bend as illustrated at 22'. The bent portions 22' of the passages terminate at release ports 28. The bent portions 22' and ports 28 are arranged to direct a coolant issuing through ports 28 at the roots of cutting edges 26 toward the tips of the cutting edges. Thus, the coolant not only cools the tips of the cutting edges but impacts against, and aids in, the removal of cut workpiece material from the cutting edges.

Figure 3:
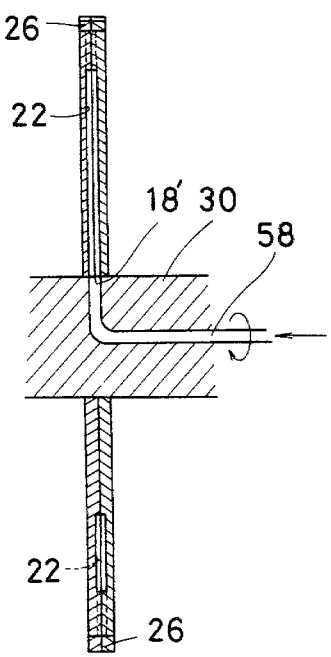
FIG. 3 is a view similar to FIG. 2, showing another saw blade supported on a spindle, according to the present invention.

According to another embodiment shown in FIG. 3, coolant guide holes or inlet ports 18' are provided through the peripheral side of inner aperture 16. A channel 58 in spindle 30 is provided for supplying coolant to the blade through guide hole 18'.

FIGS. 4 and 5 illustrate a different embodiment of the present invention wherein three blade members 32,34,36 are coupled to each other by any suitable means to form a blade. In FIG. 4, the lower part shows the outside surface of outer blade member 32 and the upper part shows a surface of the center blade member 34, which surface is opposed to outer blade member 32. According to the embodiment shown in FIGS. 4 and 5, blade member 34 has removed to form chambers 38 when the center blade member is sandwiched between the outer blade members. Coolant passages 40 are grooved on at least one side surface of center blade member 34 and communicate with chambers 38. The coolant passages 40 terminate at openings 28 at the roots of cutting edges 26. Guide holes 42 are provided on outer blade member 32. In communication with guide hole 42, a circular coolant passage 44 and interconnection passages 46 are grooved on one side surface of center blade member 34. The guide holes may be communicated directly with removed portions 38 according to other modifications. In those cases coolant passages are provided on one side surface of center blade member 34 only, another outer blade member 36 is used only for a coupler and has no passages formed therein.

Figure 6:
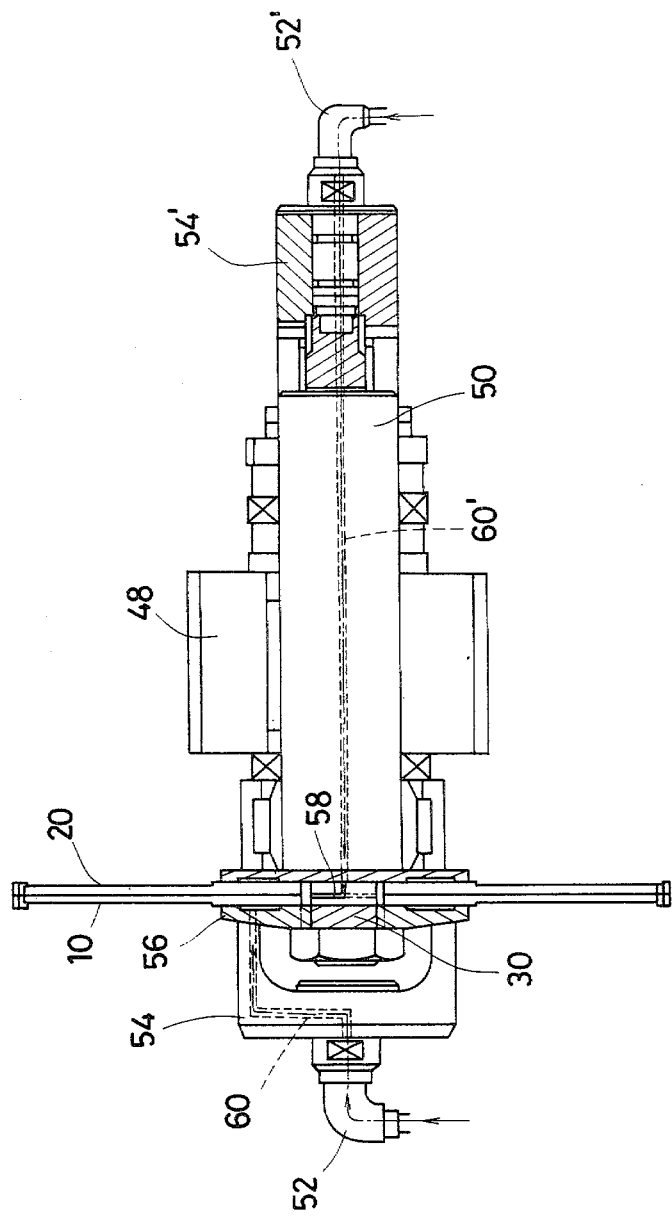
FIG. 6 is a diagramatical view showing a coolant feeding apparatus.

FIG. 6 shows a coolant feeding device adapted for use with saw blades according to the present invention. Member 10 is a blade member, member 20 is another blade member and member 30 is a spindle as aforesaid. Member 48 is a driven gear. Member 50 is a main shaft. Members 52,52' are feeding pipes for liquid or gaseous coolant. Members 54,54' are distributors. Member 56 is a clamping flange. Member 58 is a through hole in spindle 30, which hole is communicated with channel 60' passing through main shaft 50. Member 60 is another channel.

According to the embodiment shown, feeding pipes 52,52' are fixedly supported, whereas distributors 54,54' are rotatably driven and adjacent to feeding pipes 52,52'. Axial channels 60,60' are communicated with guide holes 18,18' (FIGS. 2 and 3). For convenience, FIG. 6 shows two cases of flow paths through guide holes 18,18', the former case being shown with one dotted line where clamping flange 56 is occasionally interposed, and the latter case being indicated with two dotted lines.

As is self-explanatory, the present invention relates to any saw blades so far as claimed, without regard to whether such saw blades have edges formed from same or a different material from that incorporated in the blade members the blades themselves may be toothed to provide the cutting edges.

Heat generated during a cutting operation is generally concentrated on the edges. Blade members according to the present invention are cooled and relieve the concentration of heat on the edges, thereby eminently achieving endothermic and lubricating effects by means of the coolant. Tests indicate that and emulsion of activated fatty oil sulfie 10% commercially available is well suited for use with saw blades according to the present invention.

It is further to be noted that the coolant blown from release ports (such as ports 28 of FIG. 1) first fills in so-called garrets during the meshing of a workpiece with the antecedent edge and proceeds to facilitate the cutting operation by lubricating the cutting edge and impinging on workpiece material curled in front of the cutting edge. Upon further rotation of the saw blade the coolant and chips of workpiece material are dispersed from the blade.

Heretofore it has generally been necessary to place coolant holders at different locations depending upon the size of the saw blades and the workpiece. The present invention does not required such a placement.

While the present invention has been particularly shown and described with reference to preferred embodiments thereof, it will be understood by those skilled in the art that various changes in form and detail may be made therein without departing from the spirit and scope of the present invention.

The embodiments of the present invention in which an exclusive property or privilege is claimed are defined as follows:

1. A circular saw blade having two toothed blade members immovably coupled together, said blade comprising:
   a plurality of coolant passages grooved on at least one inside surface of one of said blade members;
   a plurality of inlet ports in an outside surface of said blade;
   a plurality of release ports, there being a release port at the root peripheral side of each tooth cutting edge;
   said coolant passages including radially directed first portions communicating with said inlet ports; and,
   said coolant passages including second portions terminating at said release ports for directing a coolant toward said cutting edges to cool said cutting edges and remove cut work material therefrom.

2. A circular saw blade as claimed in claim 1 wherein said blade members are provided with a spindle-receiving aperture extending transverse to the plane of said blade members, said inlet ports being located in the peripheral surface surrounding said spindle-receiving aperture.

3. A circularr saw blade having three toothed blade members immovably coupled together, said blade comprising:
   a center blade member sandwiched between two outer blade members;
   said center blade member having portions thereof removed whereby chambers are formed in the plane of said center blade member when it is sandwiched between said outer blade members;
   a plurality of inlet ports extending through at least one of said outer blade members and communicating with said chambers; and,
   a plurality of coolant passages grooved on at least one side surface of said center blade and communicating with said chambers;
   said coolant passages terminating at openings at the root peripheral side of the tooth cutting edges to direct coolant toward said cutting edges to cool said teeth and remove cut work material therefrom.

* * * * *